(12) United States Patent
Davis et al.

(10) Patent No.: US 12,179,387 B2
(45) Date of Patent: Dec. 31, 2024

(54) SAFETY PADDLE CLAMP GUIDE FOR SAW TRAY

(71) Applicant: MMB Designs LLC, Panama City Beach, FL (US)

(72) Inventors: Melissa Anne Davis, Panama City, FL (US); William Anthony Poffel, Panama City Beach, FL (US); Marcus Thane Neely, Panama City, FL (US)

(73) Assignee: MMB DESIGNS LLC, Panama City Beach, FL (US)

( * ) Notice: Subject to any disclaimer, the term of this patent is extended or adjusted under 35 U.S.C. 154(b) by 380 days.

(21) Appl. No.: 17/653,431

(22) Filed: Mar. 3, 2022

(65) Prior Publication Data
US 2022/0184850 A1   Jun. 16, 2022

Related U.S. Application Data

(63) Continuation of application No. PCT/US2020/052776, filed on Sep. 25, 2020.

(60) Provisional application No. 62/973,263, filed on Sep. 26, 2019.

(51) Int. Cl.
*B28D 7/04* (2006.01)
*B28D 1/04* (2006.01)

(52) U.S. Cl.
CPC .............. *B28D 7/04* (2013.01); *B28D 1/047* (2013.01)

(58) Field of Classification Search
CPC ... B28D 7/02; B28D 7/04; B28D 1/02; B28D 1/03; B28D 1/04; B28D 1/047; B28D 1/042; B28D 1/043; B28D 1/044; B28D 7/043; B26D 7/01; B26D 7/20; B27B 27/02; B27B 25/06–10; B24B 7/00; B23D 7/04; B23D 47/02; B23D 59/02; B23D 47/025; B23Q 1/64; Y10T 408/567; Y10T 83/7726; Y10T 83/773; B27G 19/02

See application file for complete search history.

(56) References Cited

U.S. PATENT DOCUMENTS

| | | | |
|---|---|---|---|
| 6,152,127 A | 11/2000 | Fuhrman et al. | |
| 6,283,110 B1* | 9/2001 | Lee | B28D 7/02 125/13.01 |
| 6,752,140 B1 | 6/2004 | Fuhrman et al. | |
| 6,883,511 B1 | 4/2005 | Tsao | |
| 9,707,700 B2 | 7/2017 | Tennant et al. | |
| 2015/0290832 A1* | 10/2015 | Wang | B27B 25/10 83/436.2 |

* cited by examiner

*Primary Examiner* — Eric J Rosen
*Assistant Examiner* — John C Merino
(74) *Attorney, Agent, or Firm* — Cuenot, Forsythe & Kim, LLC; Stanley A. Kim (57) ABSTRACT

An apparatus can include a first material support member and a second material support member each configured to removably attach to a tile tray. The material support members can define a linear saw blade slot through which a saw blade extends while cutting a planar material. The apparatus also can include a first paddle and a second paddle each configured to interpose a respective portion of the planar material between the respective paddle and a respective one of the material support members. Each of the paddles further can be configured to engage the respective material support member using an alignment pin that fixes a position of the paddle relative to the position of the respective material support member.

21 Claims, 9 Drawing Sheets

SAFETY PADDLE CLAMP GUIDE FOR SAW TRAY

CROSS-REFERENCE TO RELATED APPLICATIONS

This application is a continuation application under 35 U.S.C. 111(a) of international patent application number PCT/US2020/052776 filed on Sep. 25, 2020 and designating the United States, which claimed the priority of U.S. provisional application No. 62/973,263 filed on Sep. 26, 2019, which is incorporated in its entirety herein by reference.

FIELD OF THE INVENTION

This disclosure relates to power tools and, more particularly, to saws.

BACKGROUND

A type of saw that is commonly used is a circular saw, which is a power-saw using a toothed or abrasive disc or blade to cut materials using a rotary motion spinning around an arbor. There are numerous types of circular saws, some of which are attached to tile trays and used for cutting tile, an example of such being a wet saw.

SUMMARY

An apparatus can include a first material support member configured to removably attach to a tile tray and a second material support member configured to removably attach to the tile tray, wherein opposing edges of the respective first material support member and second material support member define a first linear saw blade slot through which a saw blade of a saw extends while cutting a planar material, wherein a distance between the opposing edges of the respective first material support member and second material support member is adjustable and defines a width of the first linear saw blade slot, and the first material support member and the second material support member are configured to support the planar material while the planar material is positioned over the first linear saw blade slot. The apparatus also can include a first paddle configured to engage a first portion the planar material positioned on a first side of the first linear saw blade slot, interposing the first portion of the planar material between the first material support member and the first paddle, the first paddle configured to be engage the first material support member using at least a first alignment pin that fixes a position of the first paddle relative to a position of the first material support member. The apparatus also can include a second paddle configured to engage a second portion the planar material positioned on a second side of the first linear saw blade slot, interposing the second portion of the planar material between the second material support member and the second paddle, the second paddle configured to be engage the second material support member using at least a second alignment pin that fixes a position of the second paddle relative to the position of the second material support member.

In an arrangement, the first paddle and the second paddle can define a second linear saw blade slot through which the saw blade extends while cutting the planar material, and the second linear saw blade slot can be substantially parallel to the first linear saw blade slot.

A method can include attaching a first material support member and second material support member to a tile tray, wherein opposing edges of the respective first material support member and second material support member define a first linear saw blade slot through which a saw blade of a saw extends while cutting a planar material, wherein a distance between the opposing edges of the respective first material support member and second material support member is adjustable and defines a width of the first linear saw blade slot, and the first material support member and the second material support member are configured to support the planar material while the planar material is positioned over the first linear saw blade slot. The method also can include placing the planar material on the first material support member and the second material support member. The method also can include engaging a first paddle to a first portion of the planar material positioned on a first side of the first linear saw blade slot, the engaging the first paddle interposing the first portion of the planar material between the first material support member and the first paddle, the first paddle engaging the first material support member using at least a first alignment pin that fixes a position of the first paddle relative to a position of the first material support member. The method also can include engaging a second paddle to a second portion of the planar material positioned on a second side of the first linear saw blade slot, the engaging the second paddle interposing the second portion of the planar material between the second material support member and the second paddle, the second paddle engaging the second material support member using at least a second alignment pin that fixes a position of the second paddle relative to a position of the second material support member. The method also can include grasping at least one paddle selected from a group consisting of the first paddle and the second paddle to move the planar material under a saw blade to effectuate a cut of the planar material.

This Summary section is provided merely to introduce certain concepts and not to identify any key or essential features of the claimed subject matter. Many other features and embodiments of the invention will be apparent from the accompanying drawings and from the following detailed description.

All patents, patent applications, and publications mentioned herein are incorporated by reference in their entirety. In the case of conflict, the present specification, including definitions will control. In addition, the particular embodiments discussed below are illustrative only and not intended to be limiting.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to power tools and, more particularly, to tile trays for use with saws. A tile saw is an example of a saw that may be used in conjunction with a tile tray to cut planar materials, such as tiles. Some tile saws are configured as wet tile saws where a consistent spray of water is sprayed on the cutting surface to reduce friction as cuts are made. The purpose of this is to provide cleaner cuts with few chips along the cut edges. Although the use of wet tile saws may be adequate for solid tiles, the quality of cuts made on mosaic tiles still is deficient. Mosaic tiles comprise a flexible backing material onto which smaller tile elements are attached, typically using an adhesive. While a mosaic tile is cut using a conventional wet saw, the backing material is prone to flex and move. In consequence, the tile elements in the mosaic tile move relative to one another while the tile is being cut. Moreover, some tile elements detach from the backing material while the cut is being made. This sometimes results in significant deviations in the linearity of the cut along the tile edge, as well as missing tile elements. When this occurs, the tile that was cut usually is discarded, resulting in waste.

The arrangements described herein overcome these issues. Specifically, the apparatus described herein attaches to a tile tray and interposes the tile being cut between at least one material support member and paddles. Further, the apparatus is adjustable to define a linear blade slot through which the saw blade is passed. The apparatus can be adjusted so that the linear blade slot is only slightly wider than a width of the saw blade. This firmly holds the tile in place while the tile is being cut and, in the case of mosaic tiles, minimizes the amount of movement/flexing of the backing layer. This results in cleaner cut lines on the tiles, especially on mosaic tiles. Moreover, the apparatus prevents tile elements from becoming detached from mosaic tiles during the cutting process. Accordingly, use of the presently described apparatus while cutting tile provides tile that is more aesthetically pleasing and results in significantly fewer tiles being discarded as waste.

Figure 1:
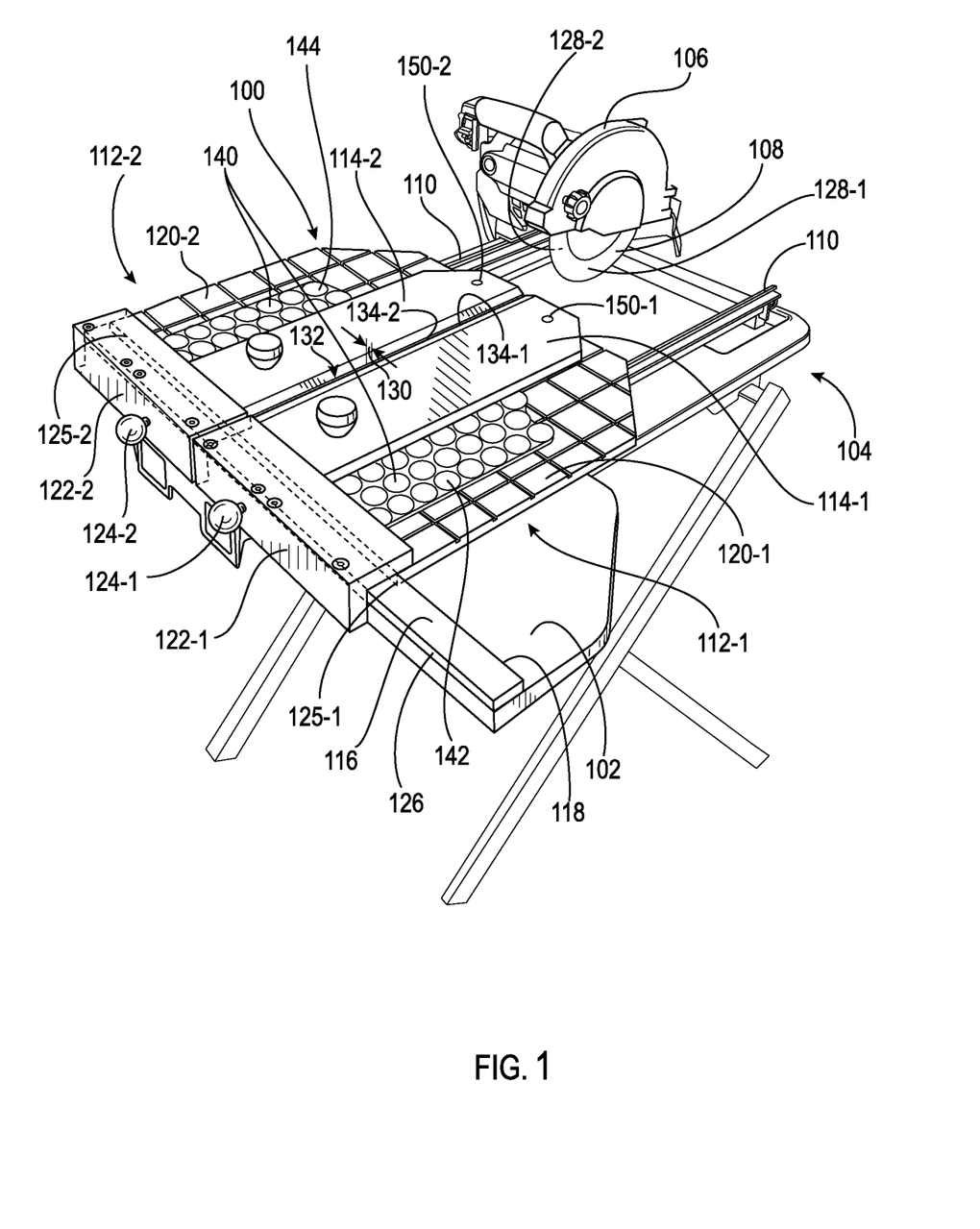
FIG. 1 is a perspective view of an example of a tray attachment attached to a tile tray.

FIG. 1 is a perspective view of an example of a tray attachment 100 attached to a tile tray 102. The tile tray 102 can be attached to a saw stand 104 to which a saw 106 is attached. The saw 106 can be a circular saw comprising a circular saw blade 108. For example, the saw 106 can be a wet saw conventionally used to cut tile. In an arrangement, the tile tray 102 can be slidably attached to the saw stand 104 via one or more rails 110, and the saw 106 can be fixedly attached to the saw stand 104, for example as arranged in a conventional wet saw. In another arrangement, the tile tray 102 can be fixedly attached to the saw stand 104, and the saw 106 can be slidably attached to the saw stand 104.

The tray attachment 100 can include a pair of material support members 112-1, 112-2 and a pair of paddles 114-1, 114-2. Each material support member 112-1, 112-2 can be configured to removably attach to the tile tray 102. In illustration, the tile tray 102 can include a lip 116 having an inner surface 118 against which tiles typically are placed for cutting. Each material support member 112-1, 112-2 can include a respective planar member 120-1, 120-2, as well as a respective attachment member 122-1, 122-2 configured to adjustably engage the lip 116 of the tile tray 102. For example, each attachment member 122-1, 122-2 can include a respective adjustable fastener 124-1, 124-2 configured to hold the respective planar members 120-1, 120-2 against the lip 116. This holds the material support members 112-1, 112-2 to the tile tray 102 in fixed positions when the fasteners 124-1, 124-2 are tightened. In illustration, each planar member 120-1, 120-2 can have an inner surface 125-1, 125-2 configured to engage the inner surface 118 of the lip 116. The adjustable fasteners 124-1, 124-2 can be tightened against an outer surface 126 of the lip 116, thus clamping the inner surfaces 125-1, 125-2 of the respective planar members 120-1, 120-2 against the inner surface 118 of the lip 116 of the tile tray 102.

When the fasteners 124-1, 124-2 are loosened a user can slide the attachment members 122-1, 122-2 along the lip 116 to adjust a width of a first linear saw blade slot (element 210 in FIG. 2) (hereinafter "first slot") defined by opposing edges of the respective attachment members 122-1, 122-2 (shown in FIG. 2), and a width 130 of second linear saw blade slot 132 (hereinafter "second slot") defined by opposing edges 134-1, 134-2 of the respective paddles 114-1, 114-2. Notably, clamping the inner surfaces 125-1, 125-2 of the respective attachment members 122-1, 122-2 against the inner surface 118 of the lip 116 of the tile tray 102 can serve to align the opposing edges of the respective attachment members 122-1, 122-2 and the opposing edges 134-1, 134-2 of the respective paddles 114-1, 114-2 to be parallel to respective sides 128-1, 128-2 of the saw blade 108.

In this regard, the saw blade 108 can extend through the first slot and the second slot 132 while cutting a planar material 140. The planar material 140 can be, for example, a tile such as a mosaic tile. A first portion 142 of the planar material 140 can be interposed between the material support member 112-1 and the paddle 114-1 on a first side of the first slot and second slot 132, and a second portion 144 of the planar material 140 can be interposed between the material support member 112-2 and the paddle 114-2 on a second side of the first slot and second slot 132. Thus, the saw blade 108 can cut the planar material into the first and second portions 144 as the user moves the tile tray 102 under the saw 106 while the saw blade 108 is rotating. A user also can manipulate a position of the tile tray 102 under the saw 106 to partially cut the planar material 140, for example to form a partial cut if it is desired to do so.

Each paddle 114-1, 114-2 can be configured to engage a respective material support member 112-1, 112-2 in a manner that fixes a position of each paddle 114-1, 114-2 with the respective material support member 112-1, 112-2. For example, at least one alignment pin 150-1 can be used to fix the position of the paddle 114-1 with respect to the material support member 112-1, and at least one alignment pin 150-2 can be used to fix the position of the paddle 114-2 with respect to the material support member 112-2. In an arrangement, the alignment pin 150-1 can be fixed to the paddle 114-1 and be configured insert into an aperture defined in the planar member 120-1 of the material support member 112-1, and the alignment pin 150-2 can be fixed to the paddle 114-2 and be configured to insert into an aperture defined in the planar member 120-2 of the material support member 112-2. In another arrangement, the alignment pin 150-1 can be fixed to the material support member 112-1 and be configured insert into an aperture defined in the paddle 114-1, and the alignment pin 150-2 can be fixed to the material support member 112-2 and be configured insert into an aperture defined in the paddle 114-2. Additional alignment pins (not shown in FIG. 1) also can be used to fix the position of each paddle 114-1, 114-2 with the respective material support member 112-1, 112-2.

Notably, the ability provided to a user to adjust the widths of the blade slots can ensure accurate, clean cuts of planar material 140. Typically, a conventional tile tray 102 includes a blade relief in the form of a channel defined in the tile tray 102, but a width of the blade relief is too wide for cutting mosaic tiles accurately. For example, the width of the blade relief may be up to $3/4$", resulting in insufficient support for the mosaic tiles. Due to the flexible nature of the backing material used for mosaic tiles, backing material can flex during the cutting process, dipping into the blade relief. In consequence, some tile elements of the mosaic tiles may detach from the backing material, and other tile elements may partially dip into the blade relief, resulting unprecise cuts and/or chips of the tile elements. This can greatly degrade the aesthetic quality of the mosaic tiles after being cut to an extent that mosaic tiles oftentimes are discarded and cuts on new tiles are attempted.

In accordance with the present arrangements, the user can adjust the widths of the blade slots to be less than the width of the blade relief in the tile tray 102. For example, the user can adjust the respective positions of the material support members 112-1, 112-2 along the lip 116 of the tile tray 102 to fix each of the opposing edges of the material support members 112-1, 112-2 and the opposing edges 134-1, 134-2 of the paddles 114-1, 114-2 in positions that are equal to or less than $1/16$" from respective sides 128-1, 128-2 of the saw blade 108 as the blade slots are passed by the saw blade 108 during the cutting process. In illustration, if the width of the saw blade is $1/16$", the width of the first slot (shown in FIG. 2) and the second slot 132 can be adjusted by the user to be equal to or less than $3/16$". Thus, the user can adjust the material support members 112-1, 112-2 and paddles 114-1, 114-2 so that the widths of the first slot and the second slot 132 are equal to or less than $1/8$" greater than the width of the saw blade 108.

The tile elements of a mosaic tile being cut can be clamped between the material support members 112-1, 112-2 and respective the paddles 114-1, 114-2 up to the respective edges 134-1, 134-2 of the paddles 114-1, 114-2, leaving the width of a strip of the mosaic tile that is left unclamped to be $3/16$" or less. Such width is sufficient for use in cutting most commonly used mosaic tiles, ensuring a minimal amount of moving of the backing material of the mosaic tile and keeping the tile elements from dipping down toward the blade relief in the tile tray 102. If a particular mosaic tile comprises especially small tile elements, the user can adjust the material support members 112-1, 112-2 along the lip 116 of the tile tray 102 to fix each of the opposing edges of the material support members 112-1, 112-2 and the opposing edges 134-1, 134-2 of the paddles 114-1, 114-2 in positions that are even closer to the sides 128-1, 128-2 of the saw blade 108. For example, the user can adjust the material support members 112-1, 112-2 and paddles 114-1, 114-2 so that the widths of the first slot and the second slot 132 are equal to or less than $1/16$" greater than the width of the saw blade 108, or even equal to or less than $1/32$" greater than the width of the saw blade 108.

Figure 2:
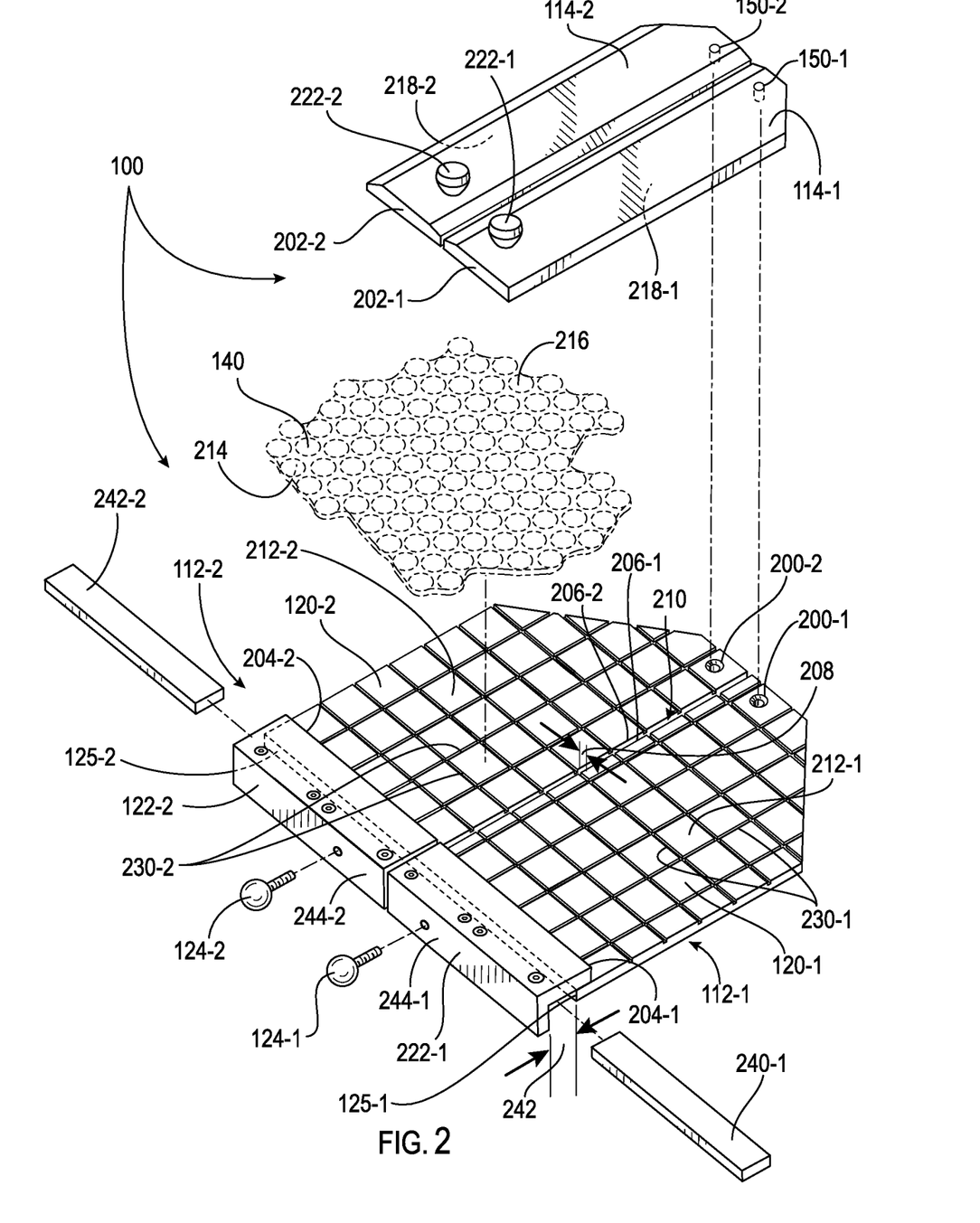
FIG. 2 is an exploded view of the tray attachment of FIG. 1.

FIG. 2 is an exploded view of the tray attachment 100 of FIG. 1. Each paddle 114-1, 114-2 can include a respective alignment pin 150-1, 150-2. The planar member 120-1, 120-2 of each respective material support member 112-1, 112-2 can include a respective aperture 200-1, 200-2 configured to receive a respective alignment pin 150-1, 150-2. Further, a surface 202-1 of the paddle 114-1 can be configured to engage an outer surface 204-1 of the attachment member 122-1 of the material support member 112-1. Similarly, a surface 202-2 of the paddle 114-2 can be configured to engage an outer surface 204-2 of the attachment member 122-2 of the material support member 112-2. Such engagements, in combination with use of the alignment pins 150-1, 150-2, can fix the positions of the paddles 114-1, 114-2 relative to the positions of the attachment members 122-1, 122-2.

As noted, a user can adjust respective positions of the material support members 112-1, 112-2 on the tile tray 102 (FIG. 1) to position opposing edges 206-1, 206-2 of the respective attachment members 122-1, 122-2 to define a desired width 208 for the first slot 210, for example as previously described. The user can tighten the fasteners 124-1, 124-2 to fix the respective material support members 112-1, 112-2 at the desired positions relative to the tile tray 102.

Prior to cutting the planar material 140, the user can place the planar material 140 onto respective top surfaces 212-1, 212-2 of the planar members 120-1, 120-2, engaging a lower surface 214 of the planar material 140 onto the respective top surfaces 212-1, 212-2. In this regard, the planar material can extend over the first slot 210 where the cut is to take place. The user then can place the respective paddles 114-1, 114-2 onto a top surface 216 of the planar material 140, engaging the alignment pins 150-1, 150-2 into the respective apertures 200-1, 200-2 and engaging a lower surface 218-1, 218-2 of each of the respective paddles 114-1, 114-2 onto the top surface 216 of the planar material 140. The weight of the paddles 114-1, 114-2 can serve to clamp the planar material 140 between the respective paddles 114-1, 114-2 and the respective material support members 112-1, 112-2. Moreover, each of the paddles 114-1, 114-2 include a respective handle 222-1, 222-2 attached to a top side of each paddle 114-1, 114-2. The user can grasp the handles to move the tile tray 102 under the saw blade while cutting the planar material. Further, using the handles 222-1, 222-2, the user can apply downward force on the paddles 114-1, 114-2 to apply additional clamping force onto the planar material 140.

In a non-limiting arrangement, a plurality of water channels 230-1, 230-2 can be defined in each of the planar members 120-1, 120-2. The water channels 230-1, 230-2 can serve to drain water away from the tray attachment 100 when the tray attachment 100 is used with a wet saw.

Optionally, the tray attachment 100 can include one or more spacers 240-1, 240-2. Certain tile trays have a very narrow lip. Thus, a distance 242 between the inner surface 125-1, 125-2 of the planar members 120-1, 120-2 and respective sides 244-1, 244-2 of the attachment members 122-1, 122-2 may be to great for the fasteners 124 to extend far enough to engage the lip. The spacers 240-1, 240-2 can be inserted between the inner surfaces 125-1, 125-2 and the lip to position the fasteners 124 closer to the lip so that the fasteners 124 will fully engage the lip when tightened.

Figures 3, 4:
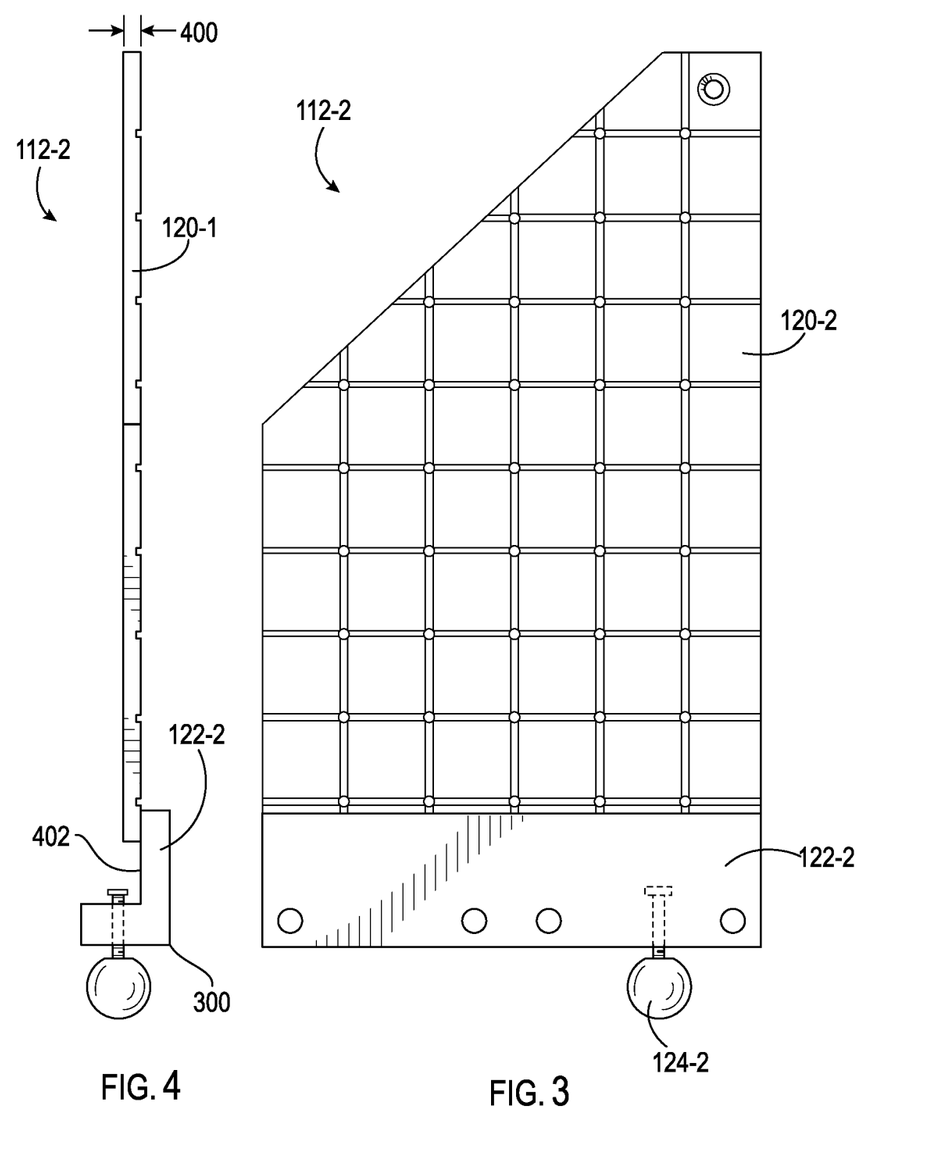
FIG. 3 is a top view of an example of a material support member.
FIG. 4 is a side view of the material support member of FIG. 3.

FIG. 3 is a top view of an example of the material support member 112-2. The material support member 112-1 can be configured in a similar manner. As noted, the material support member 112-2 can include the planar member 120-2, the attachment member 122-2 and the fastener 124-2. The planar member 120-2 can comprise a plastic suitably rigid to support the planar material 140 while the planar material 140 is being cut or can comprise metal. In an arrangement, the attachment member 122-2 can comprise a plastic suitably rigid to hold shape when the fastener is tightened against a lip of a tile tray 102. In another arrangement, the attachment member 122-2 can comprise a metal, for example steel, brass, stainless steel, etc. Examples of plastics suitable for use to form the planar member 120-2 and the attachment member 122-2 include, but are not limited to, polyamide, polystyrene, Acrylonitrile Butadiene Styrene, etc.

The attachment member 122-2 can be fixed to the planar member 120-2 using a suitable adhesive, the attachment member 122-2 can be fixed to the planar member 120-2 using suitable fasteners, or the attachment member 122-2 can be fixed to the planar member 120-2 in another suitable manner.

FIG. 4 is a side view of the material support member 112-2 of FIG. 3. A thickness 400 of the planar member 120-2 can be at least equal to a height of a lip of a tile tray 102. In another arrangement, the attachment member 122-2 can include a relief (not shown) along a side 402 into which the lip can extend. In an arrangement in which the attachment member 122-2 comprises metal, the attachment member 122-2 can be formed by bending a flat metal plate that is bent 90° along an edge 300 of the attachment member 122-2.

Figure 5:
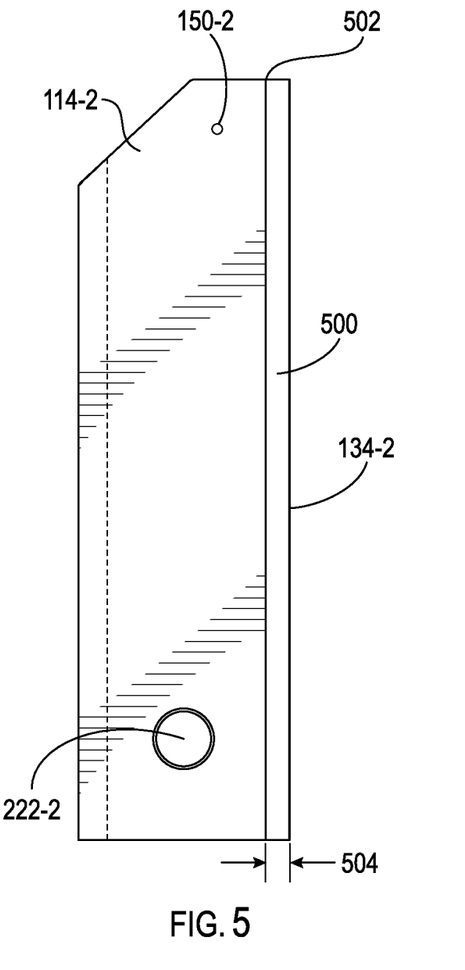
FIG. 5 is a top view of an example a paddle.

FIG. 5 is a top view of an example the paddle 114-2. The paddle 114-1 can be configured in a similar manner. As noted, the paddle 114-2 can include the handle 222-2 and at least one alignment pin 150-2. The handle 222-2 can have a circular shape, though the present arrangements are not limited in this regard. Indeed, other examples of handles 222 will be discussed herein.

The paddle 114-2 can include a bevel 500 on a side of the paddle 114-2, extending from a line 502 to the edge 134-2 that is most proximate to the saw blade 108 when the planar material 140 is cut. A width 504 of the bevel can be, for example, approximately ½", though the present arrangements are not limited in this regard. The bevel 500 can serve to divert water toward the saw blade 108 during the cutting process when a wet saw is used to perform the cut and to keep the planar material 140-2 from getting saturated with water.

Figure 6:
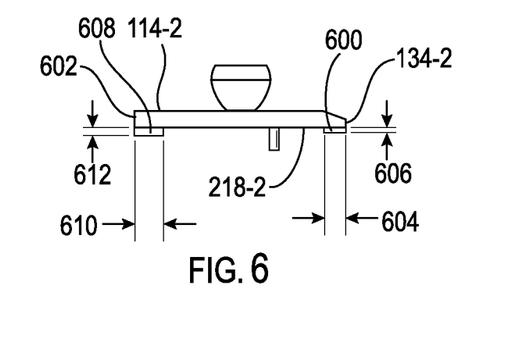
FIG. 6 is an end view of the paddle of FIG. 5.

FIG. 6 is an end view of the paddle 114-2 of FIG. 5. The paddle 114-2 can include a flange 600 on the lower surface 218-2 of the paddle 114-2 that engages the planar material 140 proximate to the edge 134-2 that is most proximate to the saw blade 108 when the planar material 140 is cut. Indeed, the flange 600 can extend linearly along the edge 134-2 and inward from the edge 134-2 toward the opposing edge 602 of the paddle 114-2. A width 604 of the flange 600 can be, for example, approximately ⅜", though the present arrangements are not limited in this regard. A thickness 606 of the flange can be, for example, approximately ⅛". The flange 600 can engage the planar material 140 to facilitate holding the planar material 140 in place while the planar material is being cut. The flange 600 can be made of rubber, for example.

Optionally, the paddle 114-2 also can include a flange 608 on the lower surface 218-2 of the paddle 114-2 along an edge 602 and extending inward toward the edge 134-2. A width 610 of the flange 608 can be, for example, approximately ½", though the present arrangements are not limited in this regard. A thickness 612 of the flange 608 can be greater than the thickness 606 of the flange 600. For example, the thickness 612 can be approximately ¼". The flange 608 can tilt the paddle 114-2 toward the edge 134-2. This can serve to divert water toward the saw blade 108 during the cutting process when a wet saw is used to perform the cut and to keep the planar material 140 from getting saturated with water.

Figure 7:
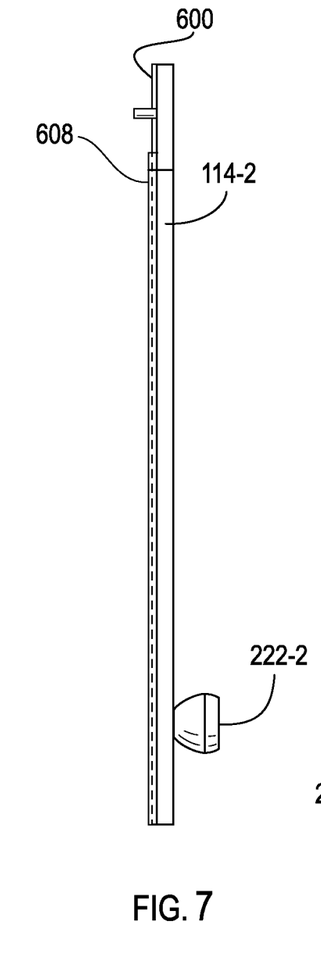
FIG. 7 is a side view of the paddle of FIG. 5.

FIG. 7 is a side view of the paddle 114-2 of FIG. 5, depicting the handle 222-2 and the flanges 600, 608.

Figure 8:
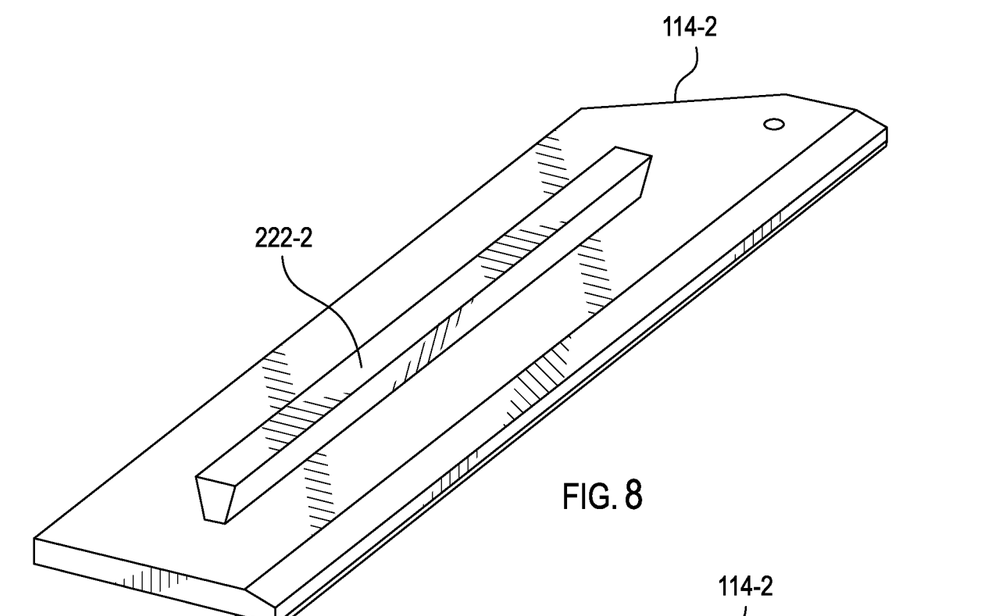
FIG. 8 is a perspective view of another example of a paddle.

FIG. 8 is a perspective view of another example of a paddle 114-2. In this example, the handle 222-2 can be linear in shape, extending a substantial length of the paddle 114-2. The user can grasp the handle 222-2 anywhere along its length. Use of such a type of handle may be preferred by some users. The handle 222-1 can be configured in a similar manner.

Figure 9:
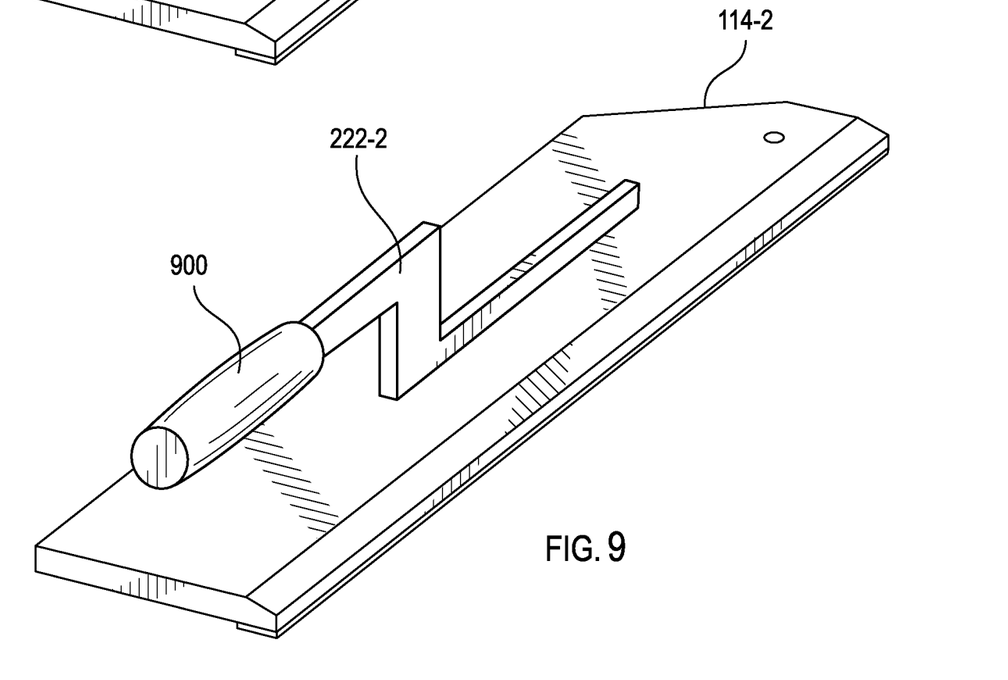
FIG. 9 is a perspective view of another example of a paddle.

FIG. 9 is a perspective view of another example of a paddle 114-2. In this example, the handle 222-2 can include a grip 900. The user can grasp the handle 222-2 using the grip 900. Again, use of such a type of handle may be preferred by some users. The handle 222-1 can be configured in a similar manner.

Figure 10:
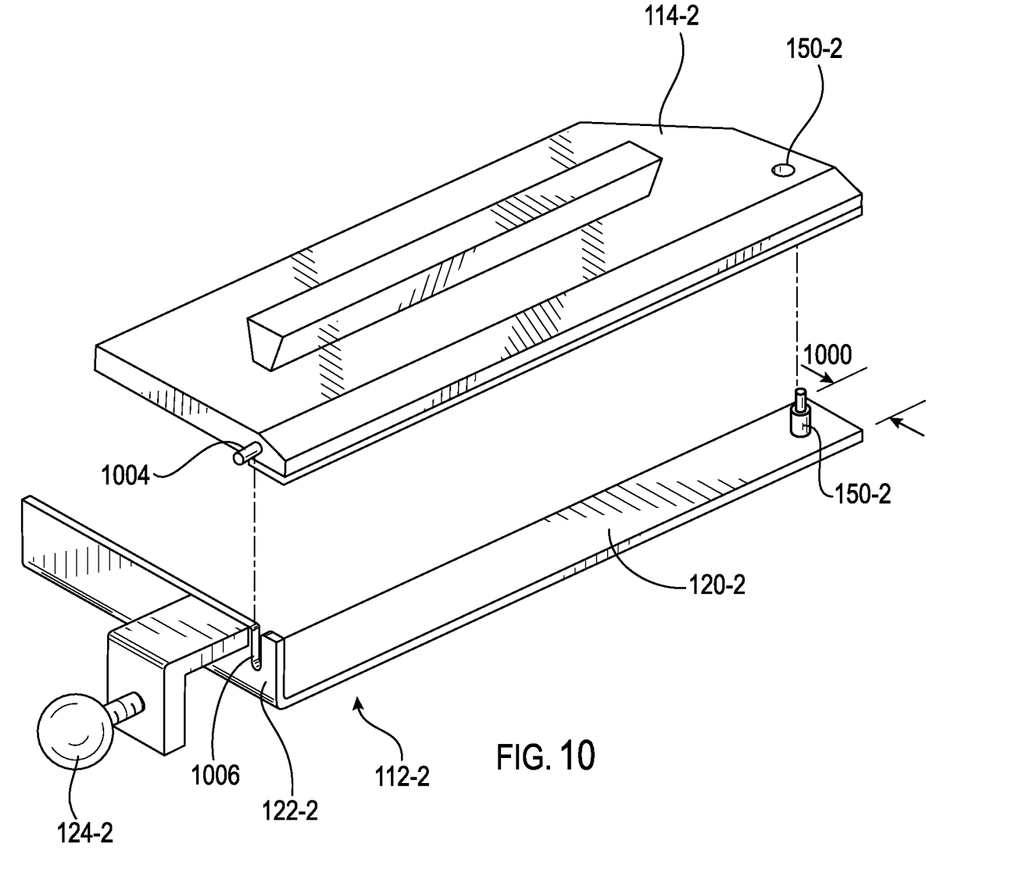
FIG. 10 is an exploded view of an example of a paddle and a material support member.

FIG. 10 is an exploded view of an example of the material support member 112-2 and paddle 114-2 of the tray attachment 100 according to another arrangement. The material support member 112-1 and paddle 114-1 can be configured in a similar manner.

In this arrangement, the material support member 112-2 can be made of metal. Further, the material support member 112-2 can be less massive than the previously discussed example, resulting in a weight savings. As discussed, the present arrangements clamp the planar material (not shown) being cut between the material support member 112-2 and the paddle 114-2. It can be beneficial to ensure that the planar material is clamped in a region of the planar material proximate to where the cut is being made. Clamping of the planar material in other regions need not be as critical. Thus, in this example, the planar member 120-2 can be significantly smaller than the previously discussed example. For example, the planar member 120-2 can have a width 1000 that is approximately 1½", or smaller. Also, a portion of the attachment member 122-2 to which the fastener 124-2 engages also can be smaller in comparison to the previous example, for example to be approximately the same width 1000 as the planar member 120-2. Thus, material used to fabricate that portion of the attachment member 122-2 can be the same material used to fabricate the attachment member 122-2, which can facilitate reduced manufacturing costs. Moreover, in a non-limiting arrangement, the planar member 120-2 and at least a portion of the attachment member 122-2 can be stamped from a single sheet of metal, and the stamped metal can be bent into the configuration depicted in FIG. 10.

As previously noted, the alignment pin 150-2 can be fixed to the planar member 120-2 and the paddle 114-2 can define an aperture 1020 that engages the alignment pin 150-2. Further, the paddle 114-2 can include an alignment pin 1004 configured to engage a slot 1006 defined in the attachment member 122-2. The alignment pin 1004 can work in concert with the alignment pin 150-2 to fix the position of the paddle 114-2 relative to the position of the attachment member 122-2.

Figures 11, 12, 13:
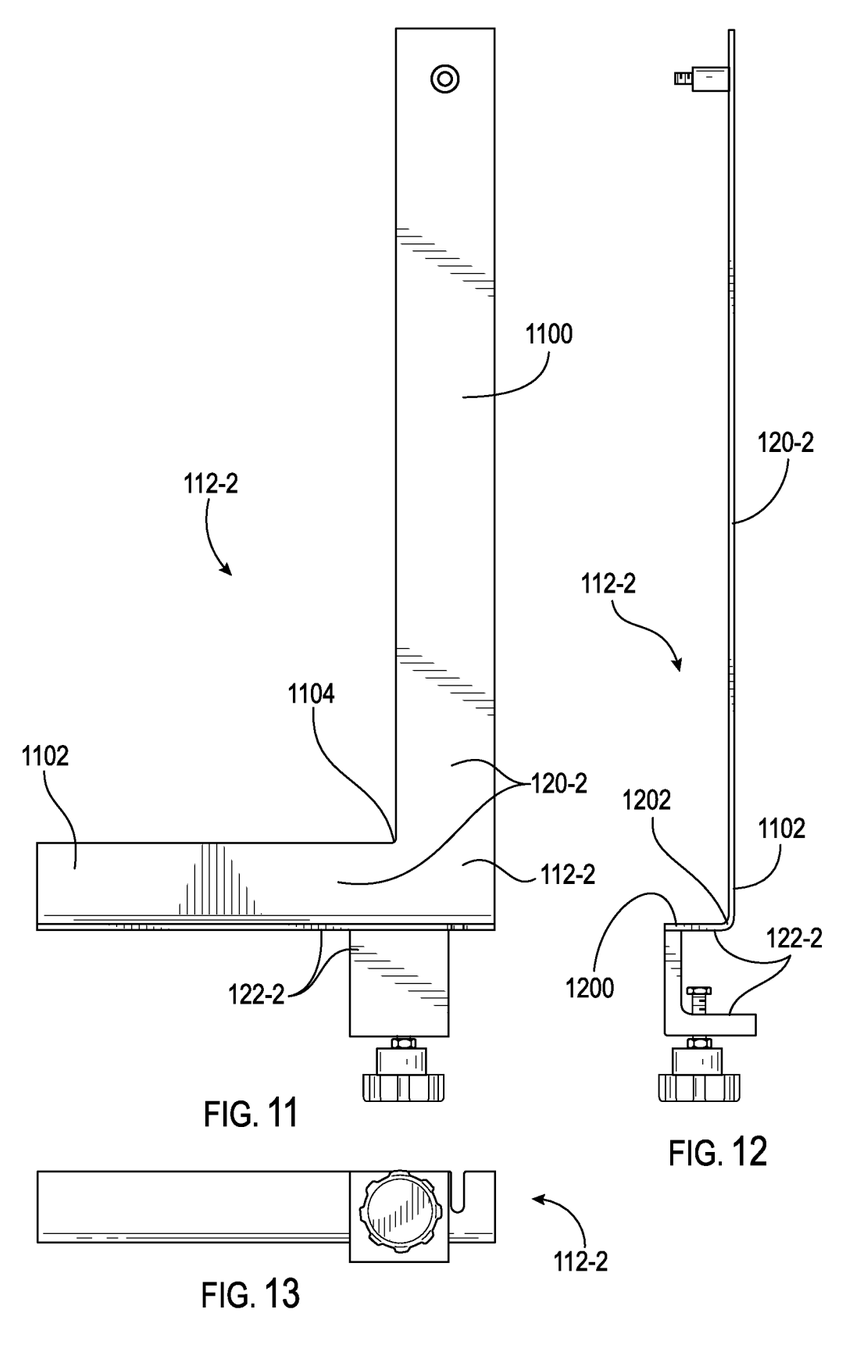
FIG. 11 is a top view of the material support member of FIG. 10.
FIG. 12 is a side view of the material support member of FIG. 10.
FIG. 13 is an end view of the material support member of FIG. 10.

FIG. 11 is a top view of the material support member 112-2 of FIG. 10. The planar member 120-2 can include a first portion 1100 where the planar material is clamped and a second portion 1102 attached to the attachment member 122-2. The portions can form a 90° angle at their joint 1104.

FIG. 12 is a side view of the material support member 112-2 of FIG. 10. The portion 1102 of the planar member 120-2 can be joined to a portion 1200 of the attachment member 122-2, for example to form a 90° angle at their joint 1202. In a non-limiting arrangement, the planar member 120-2 and the portion 1200 of the attachment member 122-2 can be stamped from a single sheet of metal and formed into the configuration of those elements depicted in FIGS. 10-12.

FIG. 13 is an end view of the material support member 112-2 of FIG. 10.

Figure 14:
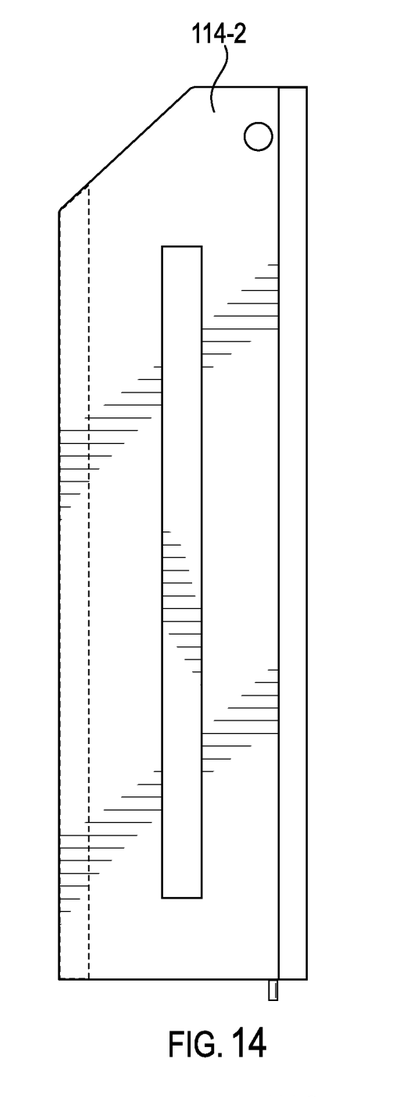
FIG. 14 is a top view of the paddle of FIG. 10.

FIG. 14 is a top view of the paddle 114-2 of FIG. 10.

Figure 15:
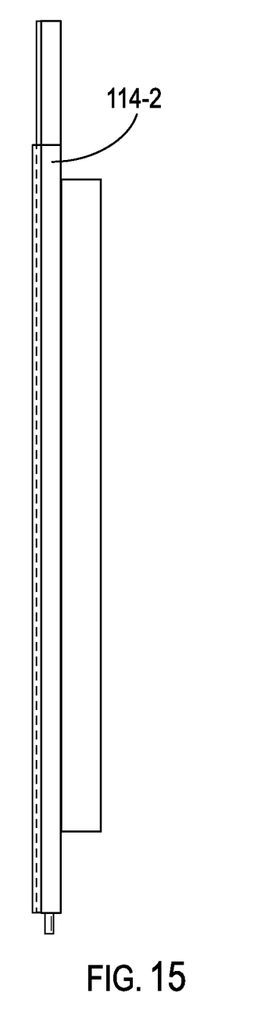
FIG. 15 is a side view of the paddle of FIG. 10.

FIG. 15 is a side view of the paddle 114-2 of FIG. 10.

Figure 16:
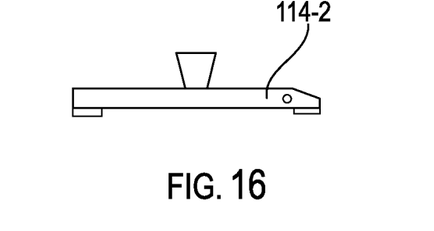
FIG. 16 is an end view of the paddle of FIG. 10.

FIG. 16 is an end view of the paddle 114-2 of FIG. 10.

Figure 17:
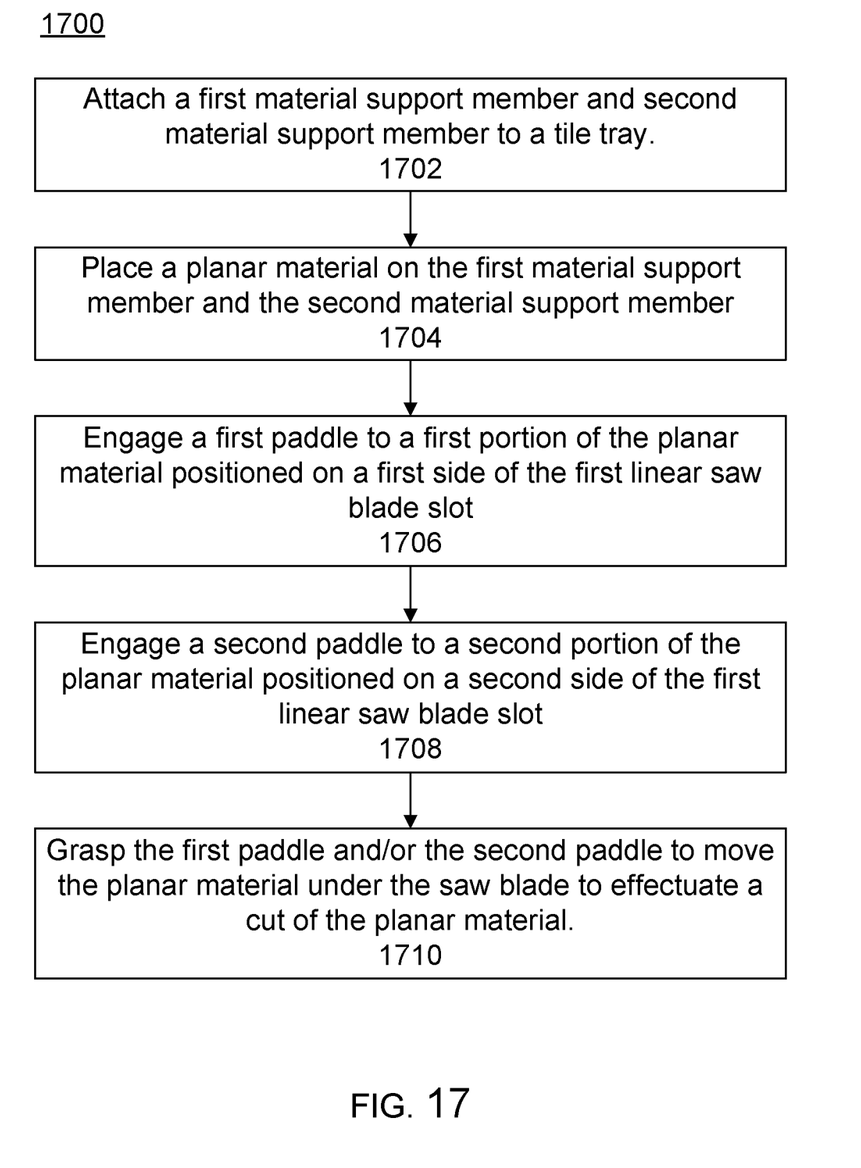
FIG. 17 is a flowchart illustrating a method of using a tray attachment.

FIG. 17 is a flowchart illustrating a method 1700 of using a tray attachment. The method 1700 can be implemented by a user (e.g., a human being) to cut a planar material, for example mosaic tile.

At step 1702 a first material support member and a second material support member each can be attached to a tile tray. Opposing edges of the respective first material support member and second material support member can define a first linear saw blade slot through which a saw blade of a saw extends while cutting a planar material. The distance between the opposing edges of the respective first material support member and second material support member can be adjustable and can define a width of the first linear saw blade slot. The first material support member and the second material support member can be configured to support the planar material while the planar material is positioned over the first linear saw blade slot.

At step 1704, the planar material can be placed on the first material support member and the second material support member.

At step 1706, a first paddle can be engaged to a first portion of the planar material positioned on a first side of the first linear saw blade slot. Engaging the first paddle can interpose the first portion of the planar material between the first material support member and the first paddle. The first paddle can be configured to be engage the first material support member using at least a first alignment pin that fixes a position of the first paddle relative to a position of the first material support member.

At step 1708, a second paddle can be engaged to a second portion of the planar material positioned on a second side of the first linear saw blade slot. Engaging the second paddle can interpose the second portion of the planar material between the second material support member and the second paddle. The second paddle can be configured to be engage the second material support member using at least a second alignment pin that fixes a position of the second paddle relative to a position of the second material support member.

The first paddle and the second paddle can define a second linear saw blade slot through which the saw blade extends while cutting the planar material. The second linear saw blade slot can be substantially parallel to the first linear saw blade slot.

At step 1710, the first paddle and/or the second paddle can be grasped to move the planar material under the saw blade to effectuate a cut of the planar material. In this regard, since the planar material is clamped by the paddles and material support members of the tray attachment, and the material support members are attached to the tile tray, the entire tile tray can move under the saw blade.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the terms "one arrangement," "an arrangement," "one or more arrangement," or similar language mean that a particular feature, structure, or characteristic described in connection with the arrangement is included in at least one arrangement described within this disclosure. Thus, appearances of the phrases "in one arrangement," "in an arrangement," "in one or more arrangement," and similar language throughout this disclosure may, but do not necessarily, all refer to the same arrangement.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An apparatus, comprising:
a first material support member configured to attach to a tile tray and a second material support member configured to attach to the tile tray, wherein opposing edges of the respective first material support member and second material support member define a first linear saw blade slot through which a saw blade of a saw extends while cutting a planar material, wherein a distance between the opposing edges of the respective first material support member and second material support member is adjustable and defines a width of the first linear saw blade slot, and the first material support member and the second material support member are configured to support the planar material while the planar material is positioned over the first linear saw blade slot;
a first paddle configured to engage a first portion of the planar material positioned on a first side of the first linear saw blade slot, interposing the first portion of the planar material between the first material support member and the first paddle, the first paddle configured to engage the first material support member using at least a first alignment pin that fixes a position of the first paddle relative to a position of the first material support member; and
a second paddle configured to engage a second portion of the planar material positioned on a second side of the first linear saw blade slot, interposing the second portion of the planar material between the second material support member and the second paddle, the second paddle configured to engage the second material support member using at least a second alignment pin that fixes a position of the second paddle relative to the position of the second material support member.

2. The apparatus of claim 1, wherein:
the saw is in a static position and the tile tray slidably moves under the saw while the saw blade cuts the planar material; and
at least one paddle selected from a group consisting of the first paddle and the second paddle comprises a handle configured to be grasped by a user to slidably move the tile tray under to effectuate the cutting of the planar material.

3. The apparatus of claim 1, wherein the first material support member comprises a tile tray attachment member configured to engage a lip of the tile tray, the apparatus further comprising:
at least one spacer configured to be positioned between the tile tray attachment member and the lip of the tile tray.

4. The apparatus of claim 3, wherein the first material support member comprises a planar member to which the tile tray attachment member is fixed, the planar member engaging the first portion of the planar material positioned on the first side of the first linear saw blade slot.

5. The apparatus of claim 4, wherein a plurality of water channels are defined in the planar member, the plurality of water channels configured to drain water away from the tile tray attachment.

6. The apparatus of claim 1, wherein the first paddle comprises a first flange on a lower surface of the first paddle, the first flange linearly extending along a first edge of the first paddle that participates in defining a second linear saw blade slot, the first flange engaging the planar material and facilitating holding of the planar material in place while cutting the planar material.

7. The apparatus of claim 6, wherein the first flange is made of rubber.

8. The apparatus of claim 6, wherein the first paddle comprises a second flange on the lower surface of the first paddle, the second flange linearly extending along a second edge of the first paddle that is opposite the first edge.

9. The apparatus of claim 8, wherein the first flange has a first thickness, and the second flange has a second thickness that is greater than the first thickness.

10. The apparatus of claim 1, the first paddle further comprising a handle configured to be grasped to move the tile tray under the saw blade to effectuate cutting of the planar material.

11. An apparatus, comprising:
a first material support member configured to attach to a tile tray and a second material support member configured to attach to the tile tray, wherein opposing edges of the respective first material support member and second material support member define a first linear saw blade slot through which a saw blade of a saw extends while cutting a planar material, wherein a distance between the opposing edges of the respective first material support member and second material support member is adjustable and defines a width of the first linear saw blade slot, and the first material support member and the second material support member are configured to support the planar material while the planar material is positioned over the first linear saw blade slot;
a first paddle configured to engage a first portion of the planar material positioned on a first side of the first linear saw blade slot, interposing the first portion of the planar material between the first material support member and the first paddle, the first paddle configured to engage the first material support member using at least a first alignment pin that fixes a position of the first paddle relative to a position of the first material support member; and
a second paddle configured to engage a second portion of the planar material positioned on a second side of the first linear saw blade slot, interposing the second portion of the planar material between the second material support member and the second paddle, the second paddle configured to engage the second material support member using at least a second alignment pin that fixes a position of the second paddle relative to the position of the second material support member;
wherein the first paddle and the second paddle define a second linear saw blade slot through which the saw blade extends while cutting the planar material, and the second linear saw blade slot is substantially parallel to the first linear saw blade slot.

12. The apparatus of claim 11, wherein:
the saw is in a static position and the tile tray slidably moves under the saw while the saw blade cuts the planar material; and
at least one paddle selected from a group consisting of the first paddle and the second paddle comprises a handle configured to be grasped by a user to slidably move the tile tray under to effectuate the cutting of the planar material.

13. The apparatus of claim 11, wherein the first material support member comprises a tile tray attachment member configured to engage a lip of the tile tray, the apparatus further comprising:
at least one spacer configured to be positioned between the tile tray attachment member and the lip of the tile tray.

14. The apparatus of claim 13, wherein the first material support member comprises a planar member to which the tile tray attachment member is fixed, the planar member engaging the first portion of the planar material positioned on the first side of the first linear saw blade slot.

15. The apparatus of claim 14, wherein a plurality of water channels are defined in the planar member, the plurality of water channels configured to drain water away from the tile tray attachment.

16. The apparatus of claim 11, wherein the first paddle comprises a first flange on a lower surface of the first paddle, the first flange linearly extending along a first edge of the first paddle that participates in defining the second linear saw blade slot, the first flange engaging the planar material and facilitating holding of the planar material in place while cutting the planar material.

17. The apparatus of claim 16, wherein the first flange is made of rubber.

18. The apparatus of claim 16, wherein the first paddle comprises a second flange on the lower surface of the first paddle, the second flange linearly extending along a second edge of the first paddle that is opposite the first edge.

19. The apparatus of claim 18, wherein the first flange has a first thickness, and the second flange has a second thickness that is greater than the first thickness.

20. The apparatus of claim 1, wherein the first material support member is configured to removably attach to the tile tray and the second material support member is configured to removably attach to the tile tray.

21. The apparatus of claim 11, wherein the first material support member is configured to removably attach to the tile tray and the second material support member is configured to removably attach to the tile tray.

* * * * *